(12) United States Patent
Koyama et al.

(10) Patent No.: US 11,808,284 B2
(45) Date of Patent: Nov. 7, 2023

(54) BLOWER

(71) Applicant: Panasonic Intellectual Property Management Co., Ltd., Osaka (JP)

(72) Inventors: Sho Koyama, Osaka (JP); Masao Kojima, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 0 days.

(21) Appl. No.: 17/755,224

(22) PCT Filed: Aug. 28, 2020

(86) PCT No.: PCT/JP2020/032538
§ 371 (c)(1),
(2) Date: Apr. 24, 2022

(87) PCT Pub. No.: WO2021/090557
PCT Pub. Date: May 14, 2021

(65) Prior Publication Data
US 2022/0403855 A1    Dec. 22, 2022

(30) Foreign Application Priority Data
Nov. 8, 2019 (JP) ................. 2019-202824

(51) Int. Cl.
*F04D 29/70* (2006.01)
*F04D 17/16* (2006.01)
(Continued)

(52) U.S. Cl.
CPC .......... *F04D 29/703* (2013.01); *F04D 17/16* (2013.01); *F04D 25/06* (2013.01); *F04D 29/056* (2013.01);
(Continued)

(58) Field of Classification Search
CPC .... F04D 29/162; F04D 29/281; F04D 29/283; F04D 25/06
See application file for complete search history.

(56) References Cited

U.S. PATENT DOCUMENTS 6,283,726 B1 * 9/2001 Fackelmann ....... F04D 29/5806
  415/58.4
2002/0025253 A1 * 2/2002 Ozeki ................ F04D 29/5806
  415/206
(Continued)

FOREIGN PATENT DOCUMENTS

EP    4056857 A1    9/2022
JP    60-070799 U   5/1985
(Continued)

OTHER PUBLICATIONS

EPC Office Action dated Dec. 8, 2022 for the related European Patent Application No. 20884908.3.
(Continued)

*Primary Examiner* — Kenneth J Hansen
(74) *Attorney, Agent, or Firm* — McDermott Will & Emery LLP

(57) ABSTRACT

A blower includes a fan and a motor, wherein the motor includes a shaft, a bearing that supports the shaft, and a motor case that covers at least a part of the bearing, the fan includes a main plate having a first surface facing the motor case and a second surface opposite to the first surface, and connected to the shaft, and a plurality of blades erected on the second surface of the main plate, and arranged radially with respect to an axis of the shaft, at least one of the fan and the motor case includes blocking members, and each of the blocking members is located apart from the shaft between the first surface of the main plate and the motor case, and surrounds the shaft.

8 Claims, 8 Drawing Sheets

(51) Int. Cl.
    *F04D 25/06*      (2006.01)
    *F04D 29/056*    (2006.01)
    *F04D 29/28*      (2006.01)
    *F04D 29/42*      (2006.01)

(52) U.S. Cl.
    CPC ....... *F04D 29/281* (2013.01); *F04D 29/4226* (2013.01)

(56) References Cited

U.S. PATENT DOCUMENTS

| | | |
|---|---|---|
| 2009/0185919 A1 | 7/2009 | Yoo et al. |
| 2009/0191070 A1 | 7/2009 | Kawachi et al. |
| 2016/0153460 A1* | 6/2016 | Okabe .................. F04D 25/082 417/423.1 |
| 2019/0219062 A1 | 7/2019 | Tatara et al. |
| 2019/0277299 A1* | 9/2019 | Byeon ..................... F04D 25/06 |

FOREIGN PATENT DOCUMENTS

| | | |
|---|---|---|
| JP | 2000-309217 | 11/2000 |
| JP | 2013-059140 | 3/2013 |
| WO | 2018/142875 | 8/2018 |

OTHER PUBLICATIONS

International Search Report of PCT application No. PCT/JP2020/032538 dated Oct. 6, 2020.

* cited by examiner

FIG. 7

| SHAPE | COMPARATIVE EXAMPLE | FIRST EXEMPLARY EMBODIMENT | FIRST MODIFIED EXAMPLE | SECOND MODIFIED EXAMPLE | THIRD MODIFIED EXAMPLE |
|---|---|---|---|---|---|
| INTRUSION AMOUNT (PIECES) | 73 | 5 | 23 | 16 | 16 |
| INTRUSION AMOUNT RATIO | 100% (REFERENCE) | 7% | 32% | 22% | 22% |
| INCREASE AMOUNT OF FAN MASS | 0g (REFERENCE) | 1.8g | 0.1g | 1.1g | 0.6g |

FIG. 9

| | COMPARATIVE EXAMPLE | SECOND EXEMPLARY EMBODIMENT |
|---|---|---|
| SHAPE | | |
| INTRUSION AMOUNT (PIECES) | 73 | 44 |
| INTRUSION AMOUNT RATIO | 100% (REFERENCE) | 60% |
| INCREASE AMOUNT OF FAN MASS | 0g (REFERENCE) | 2.7g |

BLOWER

TECHNICAL FIELD

The present disclosure relates to a blower including a fan and a motor.

BACKGROUND ART

Conventionally, a blower is used for cooling a heat generating device or the like. For example, PTL 1 discloses a sirocco fan used for cooling an in-vehicle battery. The sirocco fan described in PTL 1 is intended to reduce vibration and noise by improving assembly accuracy of the fan.

However, in the conventional blower as described in PTL 1, it has been found that minute foreign matters such as sand and dust are sucked into a bearing of a motor at the time of use, and the bearing may be damaged by the sucked minute foreign matters.

When the bearing is damaged in this way, noise is generated or the life of the motor is shortened. In particular, such a problem becomes more remarkable when the blower is used in an environment with a lot of dust and the like.

CITATION LIST

Patent Literature

Patent Literature 1: Unexamined Japanese Patent Publication No. 2013-59140

SUMMARY OF THE INVENTION

The present disclosure has been made to solve such a problem, and an object of the present disclosure is to provide a blower capable of reducing entry of minute foreign matters into a bearing of a motor.

In order to achieve the above object, one aspect of a blower according to the present disclosure is a blower including a fan and a motor, in which the motor includes a shaft including an axis, a bearing that supports the shaft, and a motor case that covers at least a part of the bearing. The fan includes a main plate having a first surface facing the motor case and a second surface opposite to the first surface, and connected to the shaft, and a plurality of blades erected on the second surface of the main plate, and arranged radially with respect to an axis included in the shaft. At least one of the fan and the motor case has one or more blocking members. The one or more blocking members are located apart from the shaft in a radial direction orthogonal to the axis between the first surface of the main plate and the motor case, and surround the shaft.

Furthermore, the fan may have a boss attached to an outer surface of the shaft and supporting the shaft. An interval between the boss and the motor case is preferably more than 0 mm and 2.5 mm or less.

Further, the one or more blocking members may have an annular shape.

The one or more blocking members may have a cylindrical shape.

The one or more blocking members may include a plurality of blocking members having different distances from the axis.

Preferably, in the main plate, one or more through holes penetrating between the first surface and the second surface are formed between the axis included in the shaft and a region where the plurality of blades are erected.

The one or more blocking members are preferably disposed at positions closer to the shaft than the one or more through holes are.

In addition, the motor case may have a side surface that extends along a direction in which the shaft of the motor extends, and surrounds the shaft. The one or more blocking members are preferably disposed at positions facing the side surface of the motor case.

Furthermore, the main plate may have a conical shape.

The fan may have one or more blocking members.

According to the present disclosure, it is possible to provide the blower capable of reducing entry of minute foreign matters into the bearing included in the motor.

BRIEF DESCRIPTION OF THE DRAWINGS

FIG. 7 is a diagram illustrating analysis results of the blowers according to the comparative example and the first exemplary embodiment.

FIG. 9 is a diagram illustrating analysis results of the blowers according to the comparative example and the second exemplary embodiment.

DESCRIPTION OF EMBODIMENTS

Figure 1:
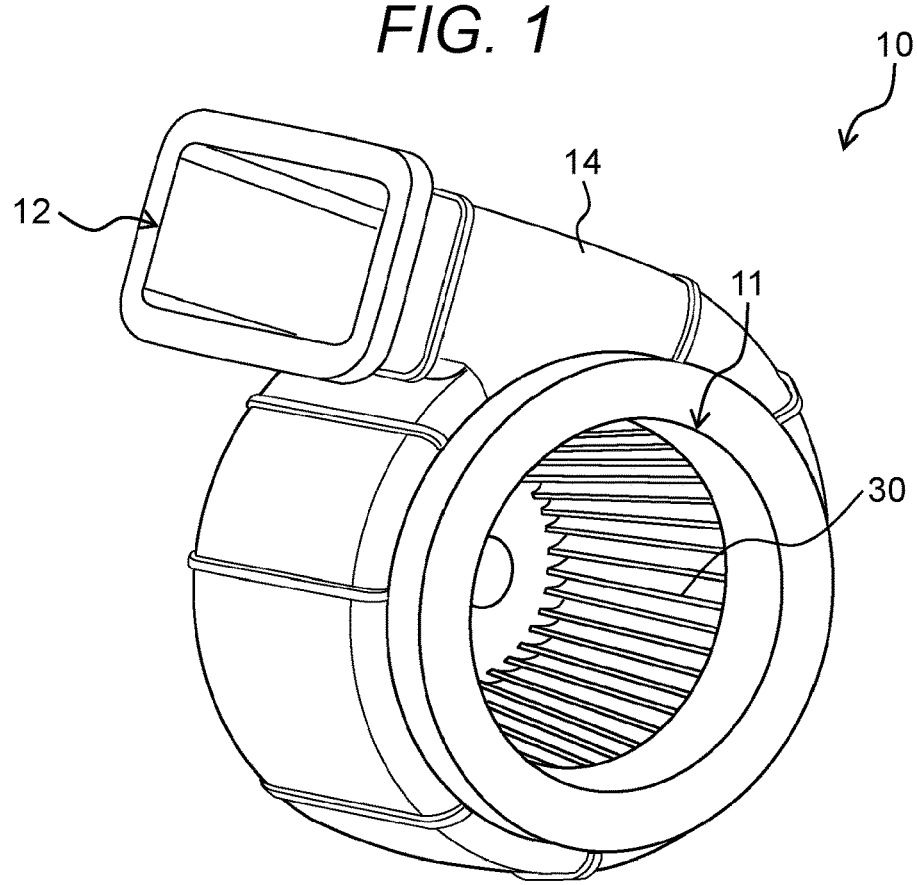
FIG. 1 is a perspective view illustrating an appearance of a blower according to a first exemplary embodiment.

Hereinafter, exemplary embodiments of the present disclosure will be described with reference to the drawings. Note that each of the exemplary embodiments described below illustrates a specific example of the present disclosure. Therefore, numerical values, shapes, materials, components, arrangement positions and connection modes of the components, and the like shown in the following exemplary embodiments are merely examples, and are not intended to limit the present disclosure.

Each drawing is a schematic diagram, and is not necessarily strictly illustrated. In each drawing, substantially the same components are denoted by the same reference numerals, and redundant description will be omitted or simplified.

First Exemplary Embodiment

1-1. Overall Configuration

Figure 2:
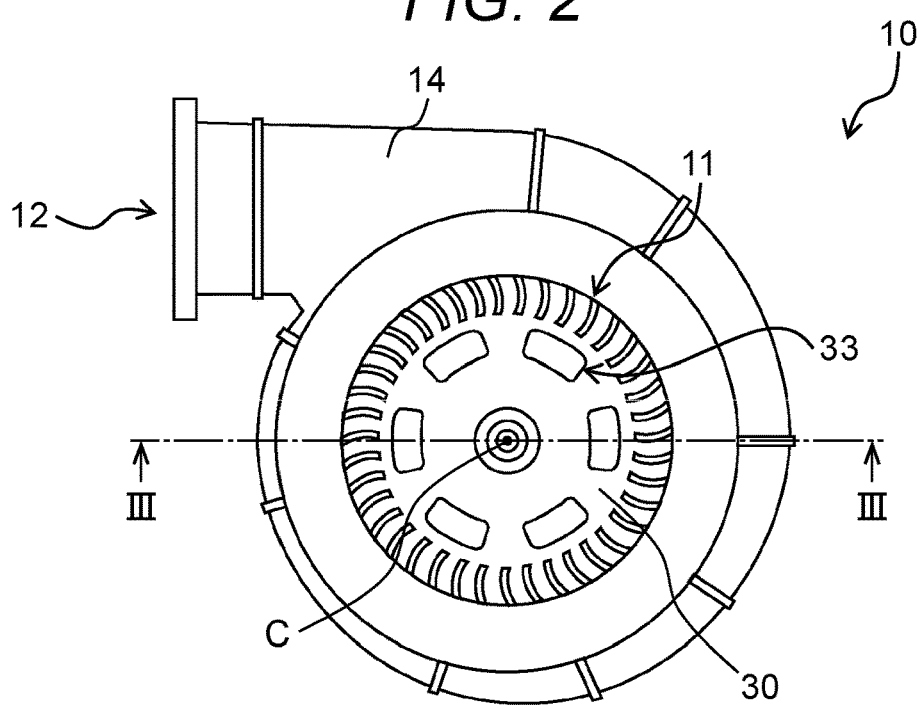
FIG. 2 is a top view illustrating an appearance of the blower according to the first exemplary embodiment.
Figure 3:
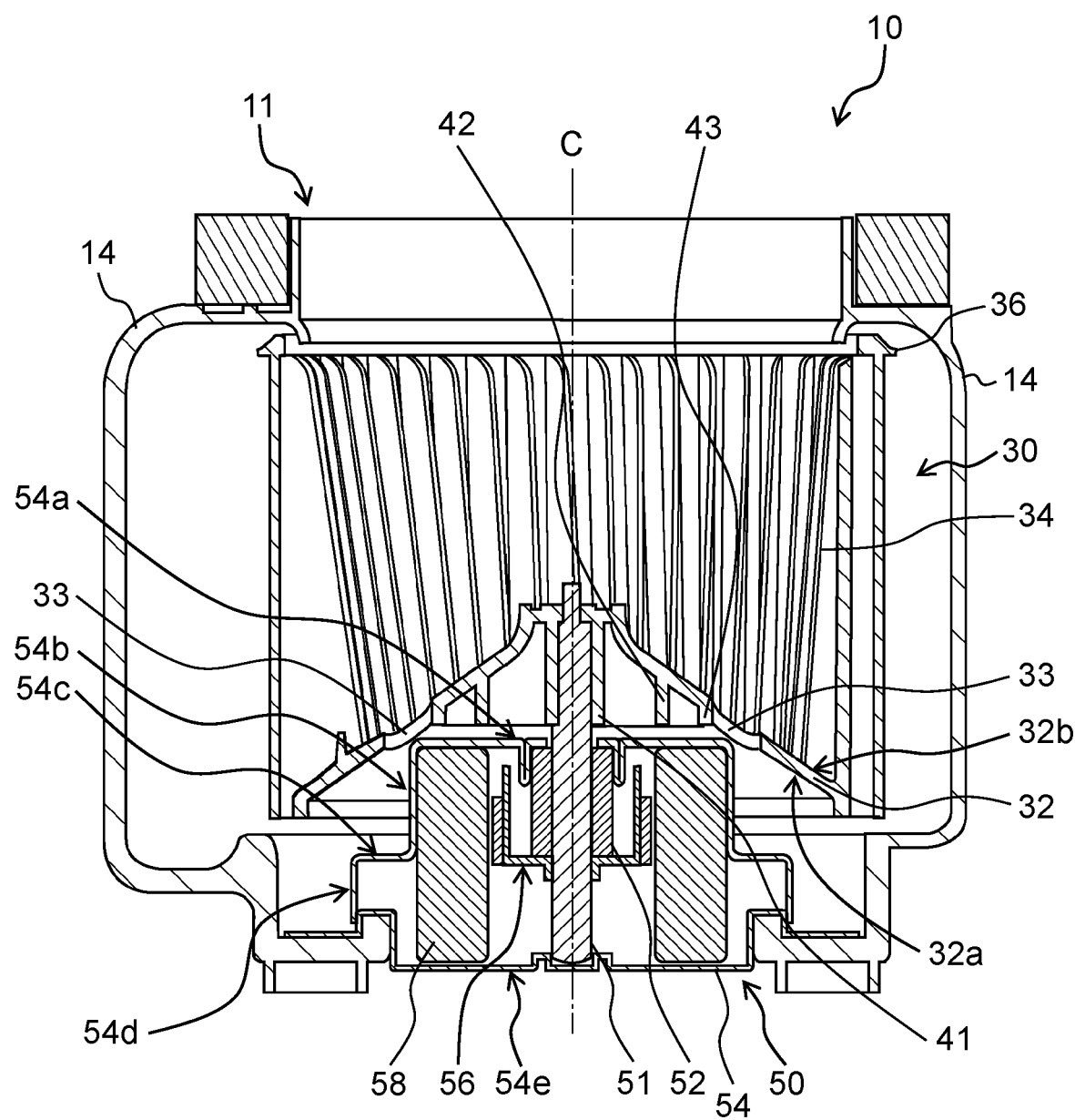
FIG. 3 is a cross-sectional view illustrating an internal structure of the blower according to the first exemplary embodiment.

An overall configuration of blower 10 according to a first exemplary embodiment will be described with reference to FIGS. 1 to 3. FIGS. 1 and 2 are a perspective view and a top view illustrating an appearance of blower 10 according to the first exemplary embodiment, respectively. FIG. 3 is a cross-sectional view illustrating an internal structure of blower 10 according to the first exemplary embodiment.

FIG. 3 illustrates a cross section taken along line illustrated in FIG. 2, in other words, a cross section taken along a plane passing through axis C of shaft 51 included in sirocco fan.

Blower 10 illustrated in FIGS. 1 and 2 is a sirocco fan that blows out a gas sucked from suction port 11 from blow-out port 12. As illustrated in FIG. 3, blower 10 includes case 14, fan 30, and motor 50. Blower 10 sucks a gas from suction port 11 and blows the gas out from blow-out port 12 by rotating fan 30 by motor 50.

As illustrated in FIGS. 1 to 3, case 14 is an appliance that serves as an outer shell of blower 10. Suction port 11 and blow-out port 12 are formed in case 14. As illustrated in FIG. 3, fan 30 and motor 50 are disposed inside case 14. In FIG. 3, motor 50 is fixed to a bottom of case 14. Fan 30 is fixed to shaft 51 of motor 50. Suction port 11 formed in case 14 is disposed on axis C (that is, a rotation axis of motor 50) included in shaft 51. Blow-out port 12 is disposed at a position radially away from axis C. Here, a radial direction refers to a direction orthogonal to axis C. As a result, a gas sucked from suction port 11 in a direction along axis C is blown out from blow-out port 12 in a direction intersecting axis C.

A material forming case 14 is not particularly limited, and may be, for example, polybutylene terephthalate (PBT), polycarbonate (PC), polypropylene (PP), or a mixed material thereof.

Motor 50 is a device that rotates fan 30. As illustrated in FIG. 3, motor 50 includes shaft 51, bearing 52, and motor case 54. Motor 50 further includes rotor 56 and stator 58. Motor 50 is not particularly limited as long as it is a motor including shaft 51, bearing 52, and motor case 54, but is an inner rotor brushless motor in the present exemplary embodiment.

Shaft 51 is a columnar member that rotates with respect to motor case 54. A material forming shaft 51 is not particularly limited, but may be, for example, metal such as stainless steel.

Bearing 52 is a member that supports shaft 51. Bearing 52 has a substantially cylindrical shape. An inner surface of bearing 52 is attached to an outer surface of shaft 51 along a direction of axis C in which shaft 51 extends. An outer surface of bearing 52 is fixed to motor case 54. Bearing 52 can reduce the rotational resistance of shaft 51 to motor case 54. As bearing 52, for example, a sintered oil-impregnated bearing can be used.

Motor case 54 is a housing that covers at least a part of bearing 52. Motor case 54 covers a part of shaft 51, bearing 52, rotor 56, stator 58, and the like. Motor case 54 is fixed to case 14. A material forming motor case 54 is not particularly limited, but may be, for example, a galvanized steel sheet or the like. In the present exemplary embodiment, motor case 54 includes top surface 54a, side surface 54b, step upper surface 54c, step side surface 54d, and bottom surface 54e.

Top surface 54a is a surface facing first surface 32a of main plate 32 included in fan 30. Top surface 54a is a surface intersecting with axis C included in shaft 51. Top surface 54a has a substantially circular shape. Side surface 54b is a surface extending from an outer edge of top surface 54a along a direction in which shaft 51 of motor 50 extends. Side surface 54b has an annular shape surrounding shaft 51 of motor 50. Side surface 54b has a substantially cylindrical shape. Step upper surface 54c extends outward from an end part of side surface 54b on a side farther from fan 30. Step upper surface 54c is a surface facing first surface 32a of main plate 32 of fan 30. Step upper surface 54c is a flat surface having a substantially annular shape. Step side surface 54d is a surface extending in parallel from an outer edge of step upper surface 54c along shaft 51 that is a rotation axis of motor 50. Step side surface 54d has an annular shape surrounding shaft 51 that is the rotation axis of motor 50. Step side surface 54d has a substantially cylindrical shape. Bottom surface 54e is a surface that covers a region surrounded by an end part of step side surface 54d on a side farther from step upper surface 54c.

Rotor 56 is a member that rotates with respect to stator 58. Rotor 56 is attached to an outer surface of shaft 51 along the direction of axis C of shaft 51.

Stator 58 is a member that rotates rotor 56. Stator 58 is disposed around rotor 56 and fixed to motor case 54.

As illustrated in FIG. 3, fan 30 is a component that is connected to shaft 51 included in motor 50, and rotates about axis C included in shaft 51. When fan 30 rotates in a predetermined direction, a gas flows from suction port 11 of blower 10 to blow-out port 12. A material forming fan 30 is not particularly limited. However, for example, a resin such as PBT, PC, or PP, or a mixed material thereof may be used. Fan 30 is made of polypropylene containing about 10 wt % of glass fiber.

Figure 4:
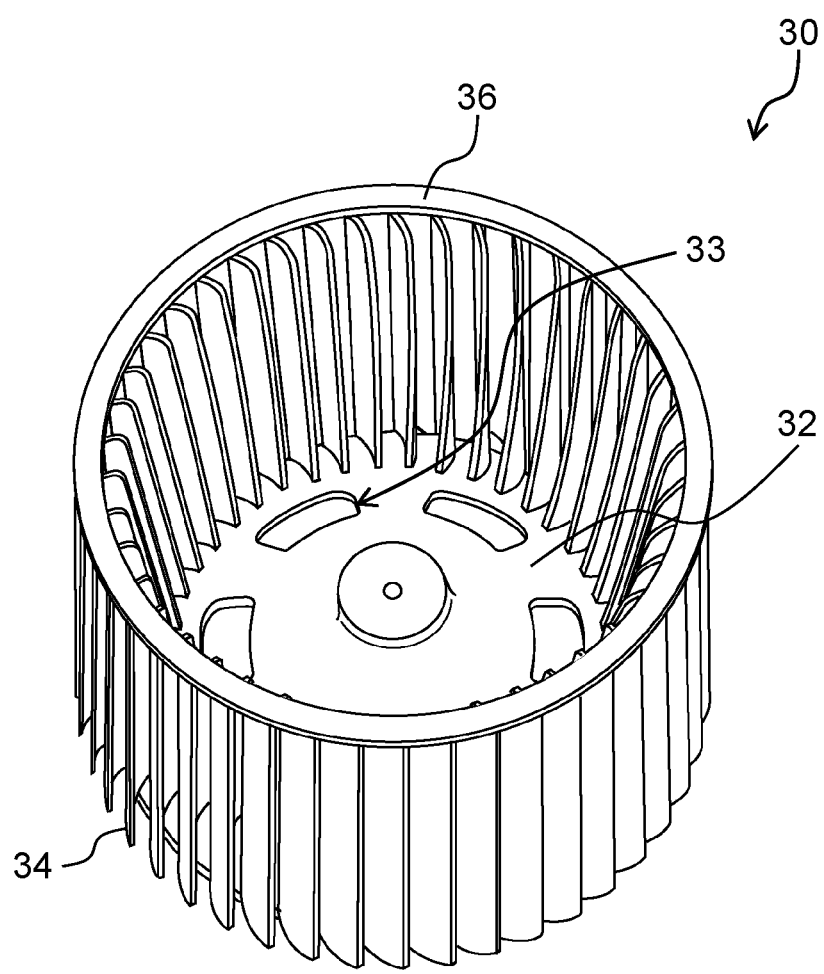
FIG. 4 is a first perspective view illustrating an appearance of a fan according to the first exemplary embodiment.
Figure 5:
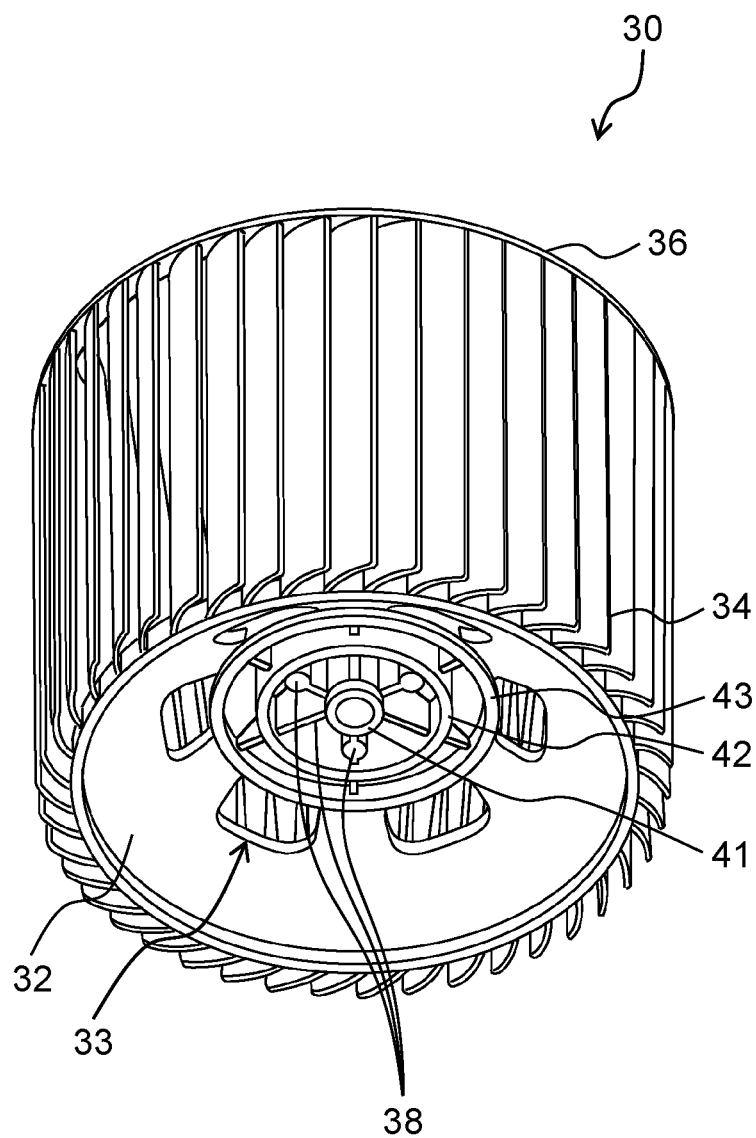
FIG. 5 is a second perspective view illustrating an appearance of the fan according to the first exemplary embodiment.

Hereinafter, the configuration of fan 30 will be described with reference to FIGS. 4 and 5 together with FIG. 3. FIG. 4 is a first perspective view illustrating an appearance of fan 30 according to the first exemplary embodiment. FIG. 5 is a second perspective view illustrating the appearance of fan 30 according to the first exemplary embodiment. As illustrated in FIGS. 3 to 5, fan 30 includes main plate 32, a plurality of blades 34, boss 41, blocking member 42, and blocking member 43. Fan 30 further includes annular member 36 and reinforcing member 38.

As illustrated in FIG. 3, main plate 32 has first surface 32a facing motor case 54 and second surface 32b opposite to first surface 32a. Main plate 32 is a member connected to shaft 51. Main plate 32 is connected to shaft 51 on its central axis. Here, the central axis of main plate 32 is a rotation axis of fan 30, and passes through a center of main plate 32. Main plate 32 has a conical shape. First surface 32a and second surface 32b are surfaces located inside and outside conical main plate 32, respectively. At least a part of motor case 54 is disposed inside a conical space formed by main plate 32.

In main plate 32, one or more through holes 33 penetrating between first surface 32a and second surface 32b are formed between axis C of shaft 51 to which main plate 32 is connected and a region where the plurality of blades 34 are erected. More specifically, one or more through holes 33 are disposed between a region where boss 41 of main plate 32 is disposed and a region where the plurality of blades 34 are erected. By forming such through holes 33, an assembly worker who assembles blower 10 can insert a fingertip or the like into through holes 33 formed in fan 30. Therefore, handling of fan 30 can be facilitated. In addition, the material required to form fan 30 can be reduced, and the weight of fan 30 can be reduced. Therefore, power required to rotate fan 30 can be reduced. In the present exemplary embodiment, a plurality of through holes 33 are formed in main plate 32. Thus, the assembly worker of blower 10 can grip fan 30 using the plurality of through holes 33. Therefore, handling of fan 30 can be further facilitated. The number of through holes 33 is not particularly limited, but in the example illustrated in FIG. 2, the number of through holes 33 is six.

Blades 34 are erected on second surface 32b of main plate 32. Blades 34 are plate-shaped members arranged radially with respect to axis C (that is, a central axis of main plate 32) included in shaft 51. Blade 34 may be curved as illustrated in FIGS. 4 and 5. The plurality of blades 34 are disposed along an outer peripheral edge of main plate 32.

Annular member 36 is an annular member attached to an end part opposite to main plate 32 with respect to the plurality of blades 34.

Boss 41 is attached to an outer surface of shaft 51 included in motor 50. Boss 41 is a member fixed to shaft 51. Boss 41 is erected on first surface 32a of main plate 32. Boss 41 has a cylindrical shape surrounding axis C included in shaft 51. An interval between boss 41 and motor case 54 of motor 50 is larger than 0 mm. Accordingly, interference between boss 41 and motor case 54 can be suppressed. Note that the interval between boss 41 and motor case 54 means a length of a gap between boss 41 and motor case 54.

Each of blocking member 42 and blocking member 43 is a member that prevents minute foreign matters such as sand from entering bearing 52 through between main plate 32 of fan 30 and motor case 54. Each of blocking member 42 and blocking member 43 is disposed apart from shaft 51 in the radial direction between first surface 32a of main plate 32 and motor case 54, and surrounds shaft 51. Here, a state in which each blocking member surrounds shaft 51 includes not only a state in which each blocking member surrounds the entire periphery of shaft 51 without interruption, but also a state in which each blocking member is disposed around shaft 51 and a part of each blocking member is interrupted. For example, each blocking member may have a substantially annular shape surrounding shaft 51, and each blocking member may be separated into a plurality of portions in a circumferential direction with axis C included in shaft 51 as a central axis. Each blocking member may be disposed in a range of an angle exceeding 50% of a total circumferential angle (360°) among circumferential angles having axis C included in shaft 51 as a central axis.

Each of blocking member 42 and blocking member 43 has an annular shape surrounding shaft 51. More specifically, as illustrated in FIG. 5, each of blocking member 42 and blocking member 43 has a cylindrical shape with the rotation axis (that is, axis C included in shaft 51) of motor 50 as a central axis. As illustrated in FIG. 3, blocking member 42 and blocking member 43 have different distances from axis C included in shaft 51. Each of blocking member 42 and blocking member 43 is disposed away from an outer edge of main plate 32 toward a side of the rotation axis.

Reinforcing member 38 is a member that connects first surface 32a of main plate 32 and boss 41. Reinforcing member 38 is a plate-like member extending in the radial direction from axis C included in shaft 51. Consequently, boss 41 can be prevented from being detached from main plate 32.

1-2. Operation

Figure 6:
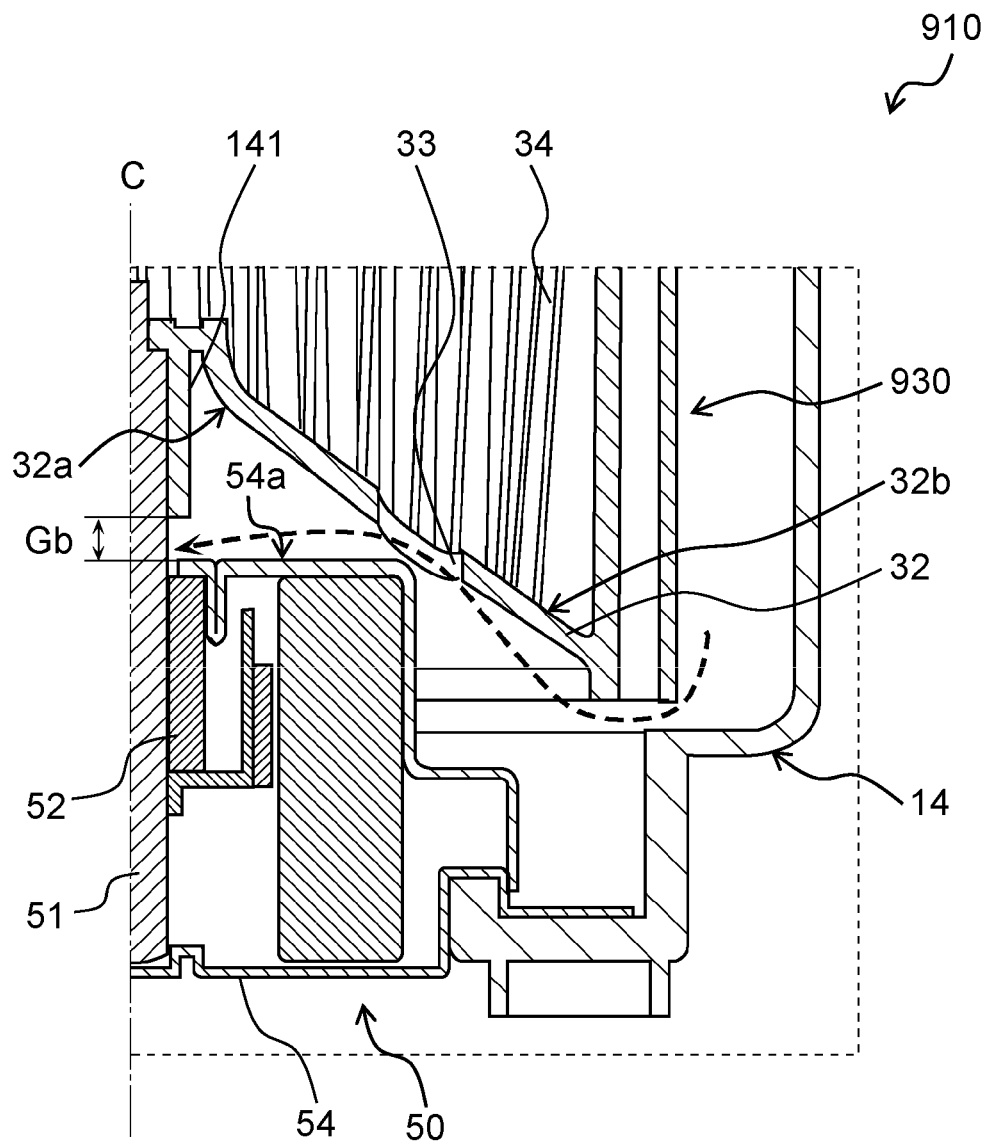
FIG. 6 is a partial cross-sectional view illustrating an internal structure of a blower according to a comparative example.

Next, an operation of blower 10 according to the present exemplary embodiment will be described with reference to FIG. 6 in comparison with a comparative example. FIG. 6 is a partial cross-sectional view illustrating an internal structure of blower 910 according to a comparative example. FIG. 6 illustrates a part of the vicinity of motor 50 and main plate 32 in a cross section taken along a plane passing through axis C of shaft 51 included in blower 910.

As illustrated in FIG. 6, blower 910 according to the comparative example includes case 14, fan 930, and motor 50. Case 14 and motor 50 of blower 910 according to the comparative example have the same configurations as case 14 and motor 50 of blower 10 according to the present exemplary embodiment, respectively.

Fan 930 included in blower 910 according to the comparative example includes main plate 32, a plurality of blades 34, and boss 141 similarly to fan 30 according to the present exemplary embodiment. Main plate 32 and the plurality of blades 34 included in fan 930 have the same configurations as main plate 32 and the plurality of blades 34 according to the present exemplary embodiment, respectively. Boss 141 differs from boss 41 according to the present exemplary embodiment in the length in a direction of the rotation axis, that is, in a direction of axis C, and coincides with boss 41 in other configurations. Boss 141 has a shorter length in the direction of the rotation axis than boss 41 according to the present exemplary embodiment. Therefore, interval Gb between boss 141 and motor case 54 in blower 910 according to the comparative example is larger than interval Gb between boss 41 and motor case 54 in blower 10 according to the present exemplary embodiment. Specifically, interval Gb is 2 mm in blower 10 according to the present exemplary embodiment, but interval Gb is 3 mm in blower 910 according to the comparative example.

Fan 930 according to the comparative example is also different from fan 30 according to the present exemplary embodiment in not including blocking member 42 and blocking member 43.

In blower 910 according to the comparative example, minute foreign matters such as sand and dust contained in a gas sucked through suction port 11 can enter between main plate 32 and motor 50 through a gap between fan 930 and case 14 as indicated by a broken arrow in FIG. 6. The minute foreign matters can also enter between main plate 32 and motor 50 through through holes 33 formed in main plate 32 of fan 930. The minute foreign matters that have entered between main plate 32 and motor 50 may enter a gap between shaft 51 of motor 50 and bearing 52 of motor 50.

In blower 910 according to the comparative example, as described above, the minute foreign matters can enter between main plate 32 of fan 930 and top surface 54a of motor case 54 of motor 50. In particular, when main plate 32 has a conical surface shape, a relatively large space is formed between main plate 32 and top surface 54a of motor case 54. Therefore, the minute foreign matters easily enter between main plate 32 and top surface 54a of motor case 54.

On the other hand, in blower 10 according to the present exemplary embodiment, fan 30 includes blocking member 42 and blocking member 43 that are disposed apart from shaft 51 in the radial direction between first surface 32a of main plate 32 and motor case 54, and surround shaft 51. A portion having a narrow gap between main plate 32 and motor case 54 can be formed by blocking member 42 and blocking member 43.

Therefore, even when the minute foreign matters enter between main plate 32 and motor 50, at least a part of the minute foreign matters heading toward shaft 51 and bearing 52 can be blocked by each blocking member. Therefore, blower 10 according to the present exemplary embodiment can reduce the intrusion of the minute foreign matters into bearing 52 of motor 50.

In the present exemplary embodiment, each of blocking member 42 and blocking member 43 is disposed to be separated from an outer edge of main plate 32 on a side of the rotation axis, that is, on a side of shaft 51. Accordingly, the minute foreign matters can flow into the space sandwiched between each blocking member and a portion outside the blocking member disposed on main plate 32. Therefore, the minute foreign matters can be reduced from flowing into a side of the rotation axis from each blocking member.

Each blocking member has an annular shape surrounding shaft 51. As a result, entry of the minute foreign matters into bearing 52 from all directions can be reduced with axis C included in shaft 51 as a central axis.

Each blocking member has a cylindrical shape with the rotation axis of motor 50 (axis C of shaft 51) as a central axis. As a result, since the shape of fan 30 can be axisymmetric with respect to the rotation axis of motor 50, vibration and noise during rotation of fan 30 can be reduced.

Fan 30 includes two blocking members having different distances from axis C included in shaft 51. As a result, even when the minute foreign matters pass through the gap between blocking member 43 having a larger distance from the rotation axis of motor 50 and motor case 54, blocking member 42 having a smaller distance from the rotation axis can block the minute foreign matters. In other words, even when the minute foreign matters pass through the gap between blocking member 43 having the larger radial distance from shaft 51 of motor 50 and motor case 54, blocking member 42 having the smaller radial distance from shaft 51 can block the minute foreign matters.

Each blocking member is disposed at a position closer to shaft 51 than through hole 33 is. As a result, it is possible to reduce the minute foreign matters that have entered between main plate 32 and motor 50 from through hole 33 from entering bearing 52.

In the present exemplary embodiment, interval Gb between boss 41 and motor case 54 is 2 mm, and is narrower than interval Gb between boss 141 and motor case 54 in the comparative example. This can reduce the minute foreign matters entering between boss 41 and motor case 54. Therefore, it is possible to reduce the minute foreign matters entering bearing 52. Noted that interval Gb is not limited to 2 mm. Interval Gb may be greater than 0 mm and about 2.5 mm or less. As a result, the minute foreign matters entering bearing 52 can be reduced as compared with the case where interval Gb is 3 mm as in blower 910 according to the comparative example.

1-3. Analysis Results

Next, in order to confirm the effect of blower 10 according to the present exemplary embodiment, a result of analysis using a computer will be described with reference to FIG. 7. FIG. 7 is a diagram illustrating analysis results of the blowers according to the comparative example and the first exemplary embodiment. FIG. 7 also illustrates an analysis result of blowers according to first to third modified examples.

First, analysis conditions of the blowers according to the comparative example and the first exemplary embodiment will be described. In this analysis, fluid analysis of a gas sucked and blown out by each blower was performed. Here, the gas contains particles simulating minute foreign matters, and in the analysis, position of each particle moving with the gas was tracked. In this analysis, a volume of the gas sucked by each blower was 100 m$^3$/h, and a rotation speed of each fan was 2350 rpm. A density of the particles was 3 mg/mm$^3$. Diameters of the particles were distributed in a range of 1 μm or more and 20 μm or less. The number of the particles flowing into each blower was 600,000/sec. Under the above conditions, the number of the particles reaching a cylinder between the boss of each fan and motor case 54 for 0.13 sec was defined as an intrusion amount of the particles. More specifically, the number of the particles reaching a cylindrical space disposed between the boss and motor case 54 was defined as an intrusion amount of the particles. Here, a central axis of the cylindrical space is the rotation axis (that is, shaft 51) of motor 50, has a diameter of 18 mm, and has a height equal to interval Gb.

As illustrated in FIG. 7, the intrusion amount was 73 in blower 910 according to the comparative example, whereas the intrusion amount was reduced to 5 in blower 10 according to the present exemplary embodiment, which corresponds to about 7% of the intrusion amount in blower 910 according to the comparative example. As described above, according to blower 10 of the present exemplary embodiment, it was confirmed that the intrusion amount of the minute foreign matters could be significantly reduced as compared with blower 910 according to the comparative example.

In fan 30 according to the present exemplary embodiment, as compared with fan 930 according to the comparative example, the length of boss 41 in the direction of axis C is extended, and blocking member 42 and blocking member 43 are added, the mass thereof is increased more than that of fan 930 according to the comparative example. FIG. 7 also illustrates an amount of increase in the mass of fan 30 with respect to the weight of fan 930 according to the comparative example. As illustrated in FIG. 7, the increase amount of the mass of fan 30 according to the present exemplary embodiment with respect to the mass of fan 930 of the comparative example is 1.8 g. This increase amount corresponds to about 2.65% of the total mass 68 g of fan 30. As described above, according to fan 30 of the present exemplary embodiment, it is possible to reduce the intrusion of the minute foreign matters into bearing 52 while suppressing the increase in mass.

Next, effects of the components according to the present exemplary embodiment will be described using analysis results of the blowers according to the first to third modified examples illustrated in FIG. 7. As illustrated in a shape field of the first modified example in FIG. 7, the blower according to the first modified example is a blower in which only boss 141 of blower 910 according to the comparative example is replaced with boss 41 of blower 10 according to the present exemplary embodiment. As illustrated in a shape field of the second modified example in FIG. 7, the blower according to the second modified example is a blower in which only blocking member 42 of blower 10 according to the present exemplary embodiment is added to blower 910 according to the comparative example. As illustrated in a shape field of the third modified example in FIG. 7, the blower according to the third modified example is a blower in which only blocking member 43 of blower 10 according to the present exemplary embodiment is added to blower 910 according to the comparative example.

In the blower according to the first modified example, the intrusion amount was able to be reduced to 23, which corresponds to about 32% of the intrusion amount in blower 910 according to the comparative example. As described above, the effect of reducing the intrusion of the minute foreign matters by extending the length of boss 41 according to the present exemplary embodiment from boss 141 according to the comparative example was confirmed. The increase amount of the mass of the fan according to the first modified example with respect to the mass of fan 930 of the comparative example was 0.1 g. This increase amount corresponds to about 0.14% of the total mass 68 g of fan 30. As described above, according to the fan according to the first modified example, it is possible to reduce the intrusion of the minute foreign matters into bearing 52 while suppressing the increase in mass.

In the blowers according to the second modified example and the third modified example, the intrusion amount was able to be reduced to 16, which corresponds to about 22% of the intrusion amount in blower 910 according to the comparative example. In addition, the amount of increase in the mass of the fan according to the second modified example is 1.1 g with respect to the mass of fan 930 of the comparative example. This increase amount corresponds to about 1.62% of the total mass 68 g of fan 30. The amount of increase in the mass of the fan according to the third modified example is 0.6 g with respect to the mass of fan 930 of the comparative example. This increase amount corresponds to about 0.88% of the total mass 68 g of fan 30. As described above, according to the fans of the second modified example and the third modified example, it is possible to reduce the intrusion of the minute foreign matters into bearing 52 while suppressing the increase in mass.

From the analysis results of the blowers according to the first modified example to the third modified example, it has been confirmed that each of boss 41, blocking member 42, and blocking member 43 according to the present exemplary embodiment has an effect of reducing the intrusion of the minute foreign matters into bearing 52. Furthermore, in the present exemplary embodiment, it has been confirmed that by combining the configurations of the first modified example to the third modified example, the effect of reducing the intrusion of the minute foreign matters into bearing 52 can be further enhanced as compared with each of the first modified example to the third modified example.

As described above, blower 10 of the present exemplary embodiment is blower 10 including fan 30 and motor 50, and motor 50 includes shaft 51 including axis C, bearing 52 that supports shaft 51, and motor case 54 that covers at least a part of bearing 52. Fan 30 includes main plate 32 having first surface 32a facing motor case 54 and second surface 32b opposite to first surface 32a, and connected to shaft 51, and a plurality of blades 34 erected on second surface 32b of main plate 32 and arranged radially with respect to axis C included in shaft 51. At least one of fan 30 and motor case 54 includes one or more blocking members 42, 43. One or more blocking members 42, 43 are located apart from shaft 51 in the radial direction orthogonal to the axis between first surface 32a of main plate 32 and motor case 54, and surround shaft 51.

As a result, it is possible to provide blower 10 capable of reducing the intrusion of the minute foreign matters into bearing 52 of motor 50.

Furthermore, fan 30 may include boss 41 attached to the outer surface of shaft 51 and supporting shaft 51.

Further, motor case 54 may include side surface 54b that extends along a direction in which shaft 51 of motor 50 extends and surrounds shaft 51.

Second Exemplary Embodiment

A blower according to a second exemplary embodiment will be described. The blower according to the present exemplary embodiment is different from blower 10 according to the first exemplary embodiment mainly in the configuration of a blocking member included in the fan. The following blower according to the present exemplary embodiment will be described focusing on differences from blower 10 according to the first exemplary embodiment.

2-1. Overall Configuration

Figure 8:
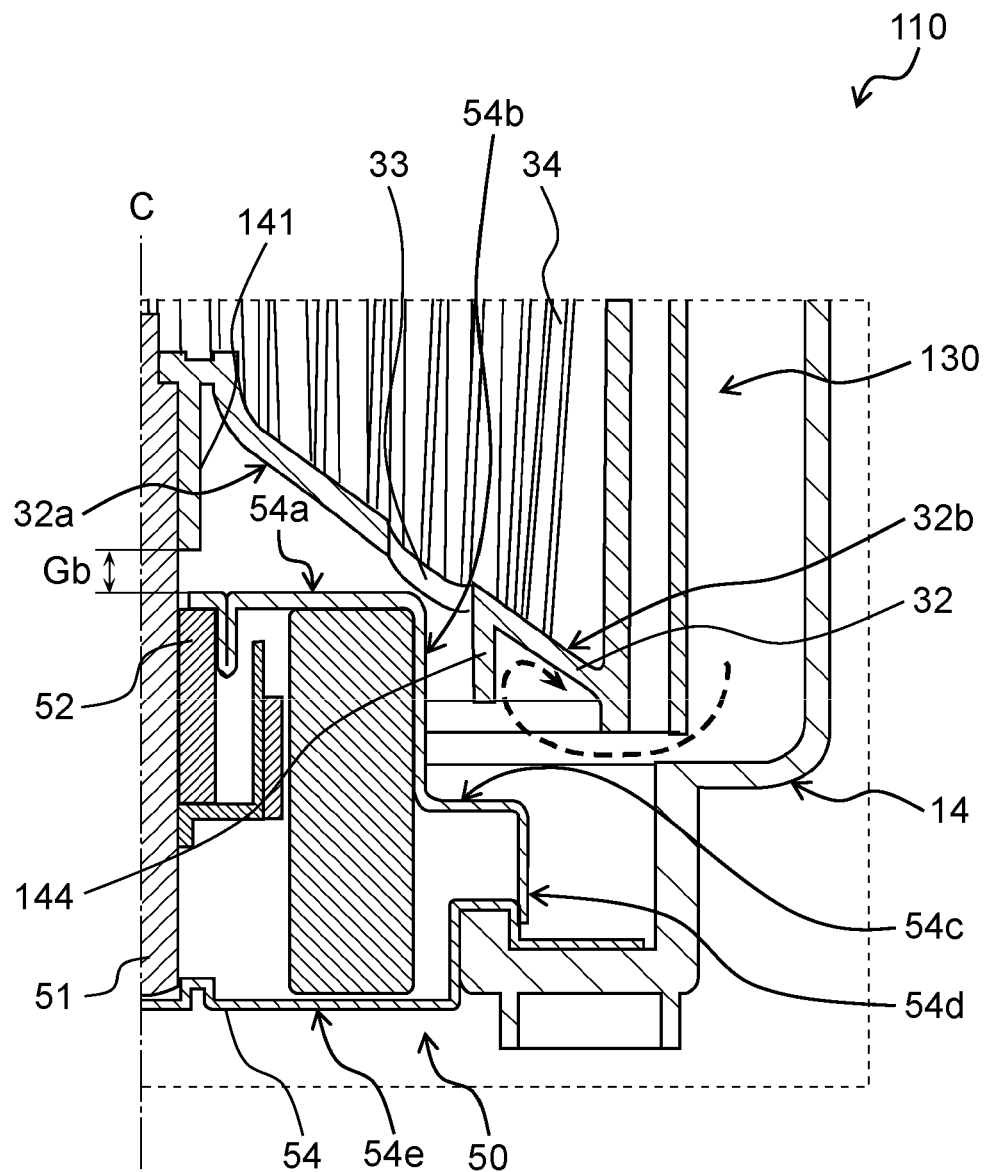
FIG. 8 is a partial cross-sectional view illustrating an internal structure of a blower according to a second exemplary embodiment.

First, an overall configuration of a blower according to the present exemplary embodiment will be described with reference to FIG. 8. FIG. 8 is a partial cross-sectional view illustrating an internal structure of blower 110 according to the second exemplary embodiment. FIG. 8 illustrates a part of the vicinity of motor 50 and main plate 32 in a cross section taken along a plane passing through axis C included in shaft 51 of blower 110.

As illustrated in FIG. 8, blower 110 according to the present exemplary embodiment includes case 14, fan 130, and motor 50. Case 14 and motor 50 of blower 110 according to the present exemplary embodiment have the same configurations as case 14 and motor 50 of blower 10 according to the first exemplary embodiment, respectively.

Fan 130 of blower 110 according to the present exemplary embodiment includes main plate 32, a plurality of blades 34, and boss 141, similarly to fan 30 according to the first exemplary embodiment. Main plate 32 and the plurality of blades 34 included in fan 130 have configurations similar to those of main plate 32 and the plurality of blades 34 according to the first exemplary embodiment, respectively. Boss 141 has the same configuration as boss 141 of fan 930 according to the comparative example described above. That is, boss 141 has a shorter length in the rotation axis direction of motor 50, that is, in the direction of axis C of shaft 51 than boss 41 according to the first exemplary embodiment.

Fan 130 according to the present exemplary embodiment further includes blocking member 144. As with each blocking member according to the first exemplary embodiment, blocking member 144 is disposed radially apart from shaft 51 between first surface 32a of main plate 32 and motor case 54, and surrounds shaft 51. Blocking member 144 according to the present exemplary embodiment is disposed at a position facing side surface 54b of motor case 54. In addition, blocking member 144 has an annular shape surrounding shaft 51. More specifically, blocking member 144 has a cylindrical shape with the rotation axis of the motor 50 as a central axis.

As illustrated in FIG. 8, blocking member 144 is disposed at a position farther from shaft 51 than through hole 33 is in the radial direction. Blocking member 144 is disposed at a position closer to shaft 51 than step side surface 54d of motor case 54 is in the radial direction.

2-2. Operation

Next, an operation of blower 110 according to the present exemplary embodiment will be described with reference to FIG. 8. Since blower 110 according to the present exemplary embodiment includes blocking member 144, the same effects as those of the blocking members according to the first exemplary embodiment can be obtained. By disposing blocking member 144 at a position facing side surface 54b included in motor case 54, a maze structure (labyrinth) is formed between main plate 32 of fan 130 and motor case 54. By forming such a maze structure, it is possible to reduce the minute foreign matters from entering the vicinity of the rotation axis, that is, the vicinity of bearing 52.

Blocking member 144 is disposed at a position closer to shaft 51 than step side surface 54d is in the radial direction. As a result, since blocking member 144 is disposed above step upper surface 54c connected to step side surface 54d, a further maze structure is formed between step upper surface 54c and blocking member 144. By forming such a maze structure, it is possible to further reduce the minute foreign matters from entering the vicinity of the rotation axis, that is, the vicinity of bearing 52.

Since an airflow as indicated by a broken line arrow in FIG. 8 can be formed in a space sandwiched between blocking member 144 and a portion outside blocking member 144 arranged on main plate 32, the minute foreign matters can flow into the space. Therefore, it is possible to reduce the minute foreign matters from entering a side of the rotation axis, that is, a side of bearing 52 from blocking member 144.

Blocking member 144 has an annular shape surrounding shaft 51. As a result, it is possible to reduce the minute foreign matters from entering bearing 52 from all directions with axis C included in shaft 51 as a central axis.

Blocking member 144 has a cylindrical shape with the rotation axis of motor 50 as a central axis. In other words, blocking member 144 has a cylindrical shape with axis C included in shaft 51 as a central axis. As a result, since the shape of fan 130 can be axisymmetric with respect to the rotation axis of motor 50, vibration and noise during rotation of fan 130 can be reduced.

2-3. Analysis Results

Next, in order to confirm the effect of blower 110 according to the present exemplary embodiment, a result of analysis using a computer will be described with reference to FIG. 9. FIG. 9 is a diagram illustrating analysis results of the blowers according to the comparative example and the second exemplary embodiment.

FIG. 9 illustrates a result of analysis under the same conditions as the analysis conditions of blower 10 according to the above-described first exemplary embodiment.

As shown in FIG. 9, in blower 910 according to the comparative example, the intrusion amount was 73. On the other hand, in blower 110 according to the present exemplary embodiment, the intrusion amount was able to be reduced to 44, which corresponds to about 60% of the intrusion amount in blower 910 according to the comparative example. As described above, according to blower 110 of the present exemplary embodiment, it was confirmed that the intrusion amount of the minute foreign matters could be significantly reduced as compared with blower 910 according to the comparative example.

Modified Example

Although the electric blower according to the present disclosure has been described above based on the exemplary embodiments, the present disclosure is not limited to the exemplary embodiments.

For example, in each of the above exemplary embodiments, the fan includes the blocking member. However, motor case 54 of motor 50 may include a blocking member, or both the fan and motor case 54 may include a blocking member. That is, at least one of the fan and motor case 54 may include one or more blocking members.

In the above-described first exemplary embodiment, fan 30 includes two blocking members 42 and 43. However, the number of the blocking members is not limited to two, and may be one or more. For example, as in the second modified example and the third modified example illustrated in FIG. 7, the number of the blocking members may be one.

Fan 30 includes two blocking members having different radial distances from axis C included in shaft 51. However, three or more blocking members having different distances from axis C included in shaft 51 may be provided. That is, fan 30 may include a plurality of blocking members having different distances from axis C included in shaft 51.

In each of the above exemplary embodiments, the entire bearing is covered with the motor case. However, a part of the bearing may be covered. For example, a part of the bearing on a side of the fan may be exposed to an outside from the motor case.

In addition, the present disclosure also includes a mode obtained by applying various modifications conceived by those skilled in the art to the above exemplary embodiments, or a mode achieved by arbitrarily combining components and functions in the exemplary embodiments without departing from the gist of the present disclosure.

INDUSTRIAL APPLICABILITY

The technique of the present disclosure can be used for, for example, a sirocco fan. In particular, the technique of the present disclosure is useful as a sirocco fan used in an environment with many minute foreign matters, such as a sirocco fan used for cooling an in-vehicle battery.

The invention claimed is:

1. A blower comprising a fan and a motor, wherein
the motor includes:
a shaft including an axis;
a bearing that supports the shaft; and
a motor case that covers at least a part of the bearing,
wherein:
the fan includes:
a main plate having a first surface facing the motor case and a second surface opposite to the first surface, and connected to the shaft; and
a plurality of blades erected on the second surface of the main plate, and arranged radially with respect to the axis included in the shaft,
at least one of the fan and the motor case includes one or more blocking members, the one or more blocking members being configured to prevent entry of minute foreign matters,
the one or more blocking members are located apart from the shaft in a radial direction orthogonal to the axis between the first surface of the main plate and the motor case, and surround the shaft,
in the main plate, one or more through holes penetrating between the first surface and the second surface are formed between the axis included in the shaft and a region where the plurality of blades are erected, and
the one or more blocking members are disposed at positions closer to the shaft than the one or more through holes are.

2. The blower according to claim 1, wherein the fan includes a boss attached to an outer surface of the shaft and supporting the shaft, and an interval between the boss and the motor case is greater than 0 mm and 2.5 mm or less.

3. The blower according to claim 1, wherein the one or more blocking members have an annular shape.

4. The blower according to claim 1, wherein the one or more blocking members have a cylindrical shape.

5. The blower according to claim 1, wherein the one or more blocking members include a plurality of blocking members having different distances from the axis.

6. The blower according to claim 1, wherein
the motor case has a side surface that extends along a direction in which the shaft included in the motor extends, and surrounds the shaft, and
the one or more blocking members are disposed at positions facing the side surface of the motor case.

7. The blower according to claim 1, wherein the main plate has a conical shape.

8. The blower according to claim 1, wherein the fan includes the one or more blocking members.

* * * * *